United States Patent [19]
Kraft et al.

[11] Patent Number: 5,730,032
[45] Date of Patent: Mar. 24, 1998

[54] SAW SETTER

[75] Inventors: James E. Kraft, Delevan; Shane M. Blakeslee, Olean, both of N.Y.

[73] Assignee: Kraft-Tech Machinery, Inc., Delevah, N.Y.

[21] Appl. No.: 783,034

[22] Filed: Jan. 14, 1997

[51] Int. Cl.⁶ ................................ B23D 63/02
[52] U.S. Cl. ................ 76/61; 76/63; 269/235; 269/236; 269/238
[58] Field of Search .................. 76/61, 63, 66, 76/68; 269/235, 236, 238

[56] References Cited

U.S. PATENT DOCUMENTS

| | | |
|---|---|---|
| 325,035 | 8/1885 | Winston . |
| 579,220 | 3/1897 | Chellieu ............... 76/61 |
| 968,771 | 8/1910 | Kistner ............... 76/61 |
| 1,001,642 | 8/1911 | Hodgson ............... 76/61 |
| 1,612,618 | 12/1926 | Durham et al. . |
| 1,766,009 | 6/1930 | Woods . |
| 1,828,392 | 10/1931 | Carpenter . |
| 1,878,077 | 9/1932 | Waller ............... 76/63 |
| 2,272,621 | 2/1942 | Merrill ............... 269/236 |
| 2,501,125 | 3/1950 | Herring ............... 76/66 |

*Primary Examiner*—Douglas D. Watts
*Attorney, Agent, or Firm*—Joseph P. Gastel

[57] ABSTRACT

A saw setter having a base, a pair of clamping members mounted on the base for receiving a saw blade therebetween with the saw teeth pointing upwardly, an advancing lever and pawl for engaging selected teeth and moving the saw blade through the clamping members, a first jaw pivotally mounted on the base, an actuating lever pivotally mounted on the base and connected to the first jaw by a force magnifying linkage, a second jaw pivotally mounted on the base, a linkage between the first and second jaws for causing them to either move simultaneously toward each other or away from each other and a first saw setting finger on the first movable jaw and a second saw setting finger on the second movable jaw.

27 Claims, 7 Drawing Sheets

SAW SETTER

BACKGROUND OF THE INVENTION

The present invention relates to an improved manually operated saw setter.

There are numerous types of saw setters in existence, many of which are cam operated and many of which involve complex mechanical linkages. It is with an improved manually operated saw setter that the present invention is concerned.

BRIEF SUMMARY OF THE INVENTION

It is accordingly the object of the present invention to provide an improved manually operated saw setter which includes a relatively simple highly efficient mechanical linkage. Other objects and attendant advantages of the present invention will readily be perceived hereafter.

The present invention relates to a saw setter comprising a base having an upper base portion and a lower base portion, a first pivot on said lower base portion, a lever handle pivotally mounted on said first pivot and including an outer lever portion to one side of said first pivot and an inner lever portion to the other side of said first pivot, said outer lever portion being longer than said inner lever portion, a second pivot on said upper base portion, a first movable jaw pivotally mounted on said second pivot, a first mechanical coupling between said inner lever portion and said first pivotal jaw below said second pivot, a third pivot on said upper base portion, a second movable jaw pivotally mounted on said third pivot, and a second mechanical coupling between said first and second movable jaws.

The various aspects of the present invention will be more fully understood when the following portions of the specification are read in conjunction with the accompanying drawings wherein:

DETAILED DESCRIPTION OF THE INVENTION

Summarizing briefly in advance, the improved saw setter 10 of the present invention is a highly simplified saw setter which utilizes two manually operated handles to selectively advance and set saw blades in a highly efficient manner. The saw setting aspect is especially simplified and efficient in view of the linkages through which a manual force is transmitted to saw setting fingers.

The improved saw setter 10 includes a base 11 (FIGS. 2, 3, 6 and 6A) having a central channel portion 12 and flanges 13 extending horizontally therefrom. The base 11 includes an end block 19 (FIGS. 2, 6, 6A and 9) which is welded to the end of channel 12 and to the flanges 13. Suitable screws 14 (FIGS. 2, 3 and 6) extend through suitable apertures in flanges 13 to secure base 11 to the surface 15 of a suitable support member 17.

Figure 1:
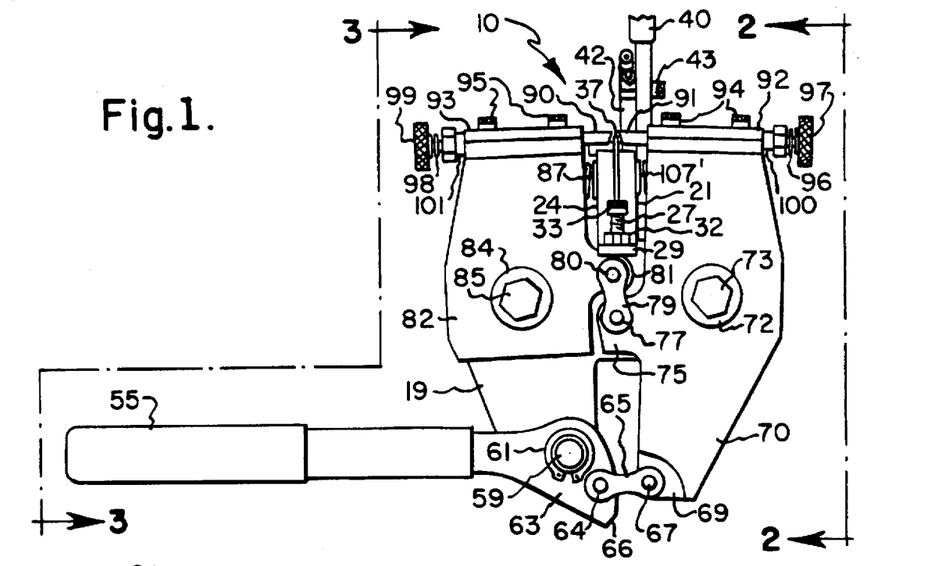
FIG. 1 is a fragmentary end elevational view of the improved saw setter of the present invention with the jaws spread apart and with a saw blade located between saw-clamping members.
Figures 2, 9:
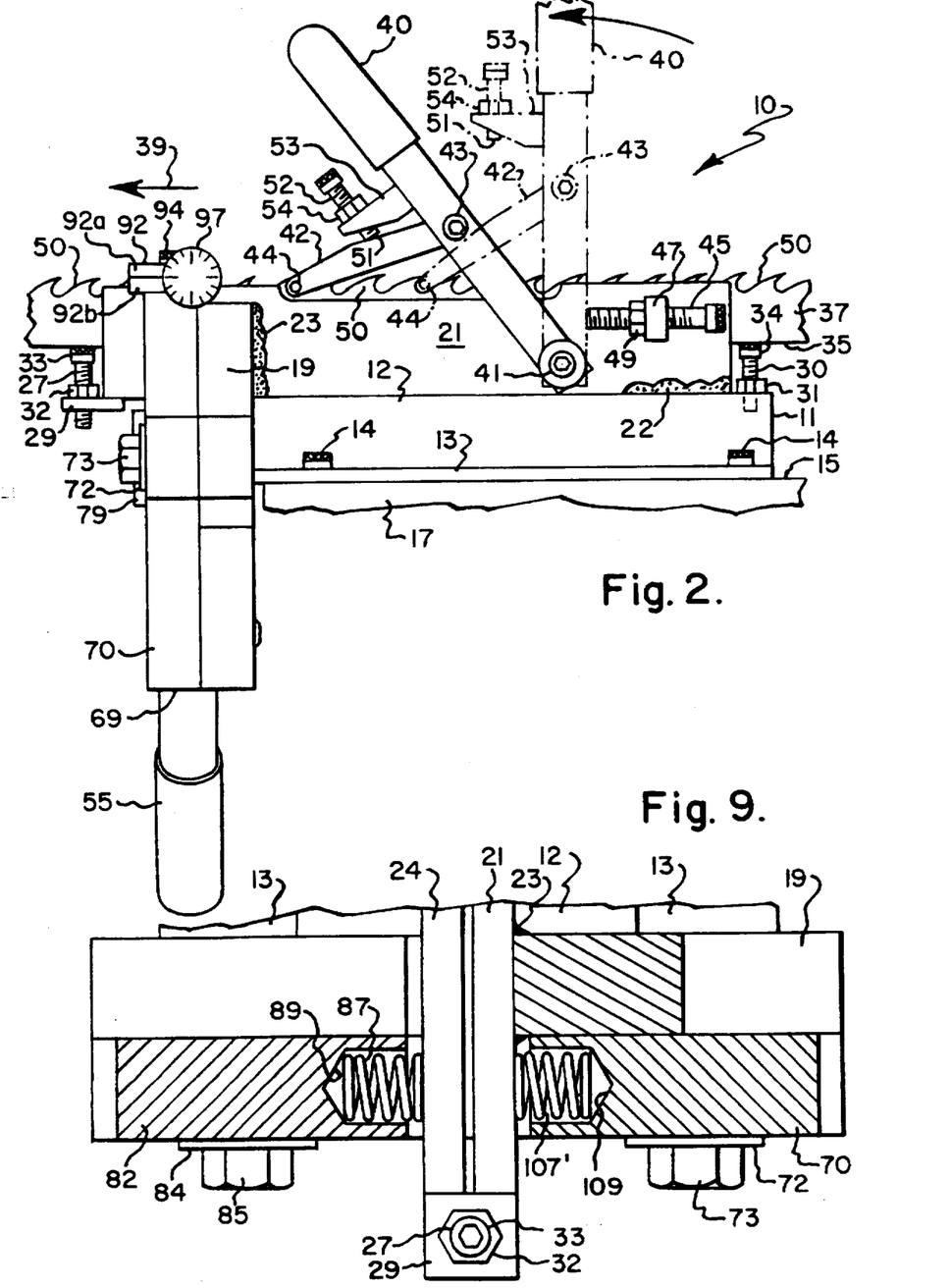
FIG. 2 is an enlarged fragmentary side elevational view taken substantially in the direction of arrows 2—2 of FIG. 1 and showing the linkage for advancing a saw blade to be set.
FIG. 9 is an enlarged fragmentary cross sectional view taken substantially along line 9—9 of FIG. 5 and showing the relationship between the movable jaws and the saw clamping members.
Figures 3, 4A, 4B:
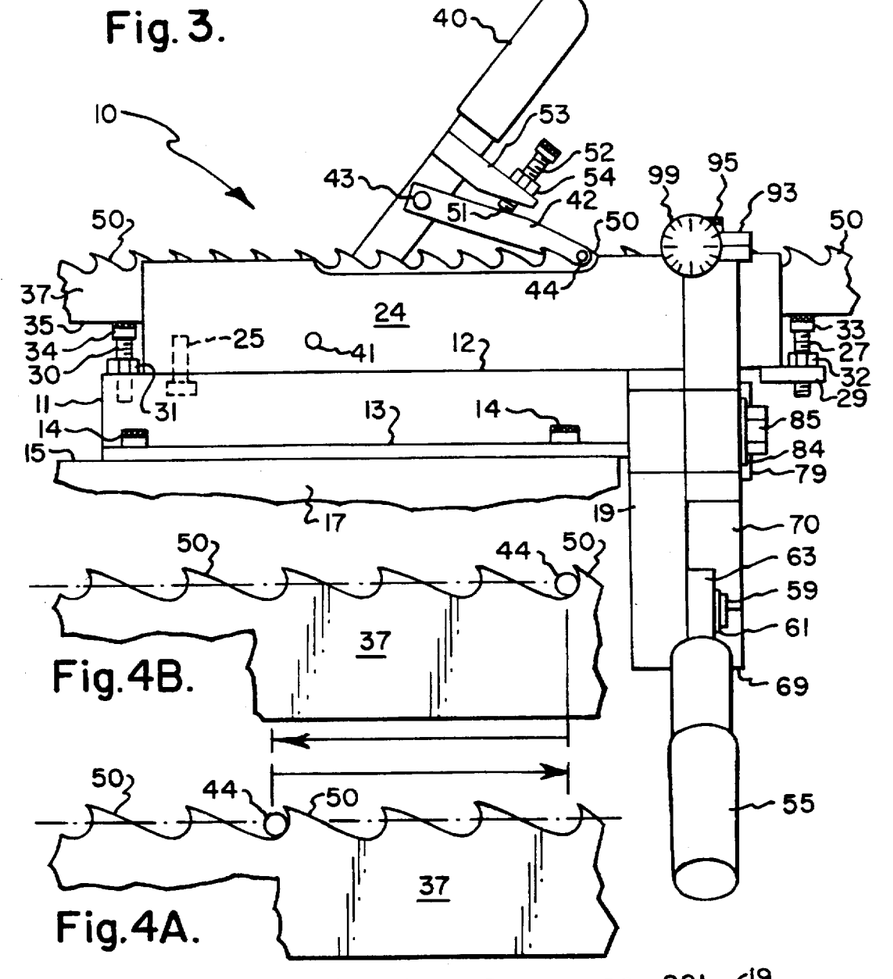
FIG. 3 is an enlarged fragmentary side elevational view taken substantially in the direction of arrows 3—3 of FIG. 1 and showing the opposite side of the saw setter from the view of FIG. 2.
FIGS. 4A and 4B are enlarged fragmentary diagrammatic views showing the distance which a saw blade is advanced by the advancing linkage.
Figures 5A, 6A, 8A:
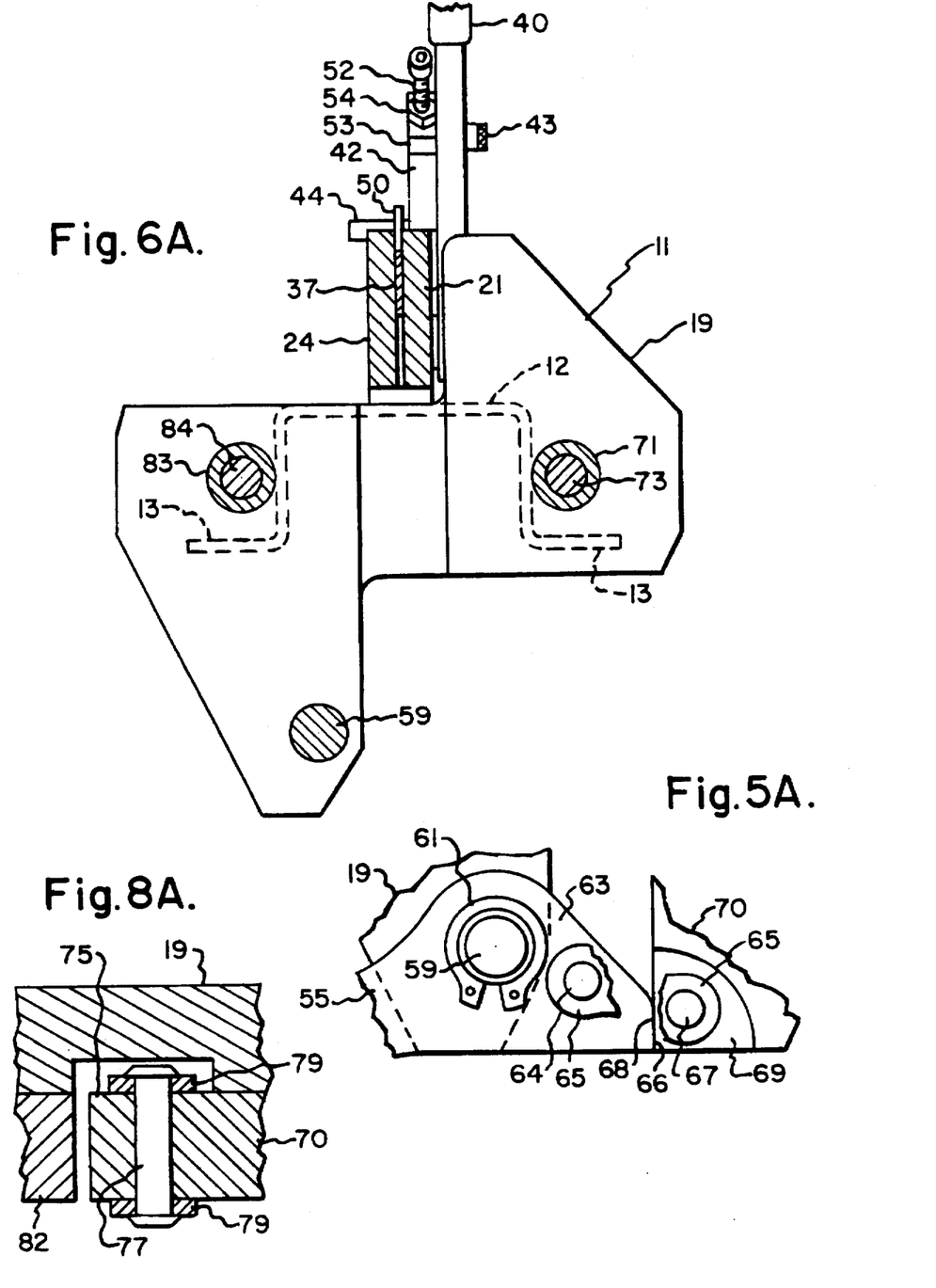
FIG. 5A is an enlarged fragmentary view of a portion of FIG. 5 and showing the position of the handle lever in the jaw closing position.
FIG. 6A is an enlarged cross sectional view taken substantially along line 6A—6a of FIG. 6 and showing the end of the base of the saw setter.
FIG. 8A is an enlarged fragmentary cross sectional view taken substantially along line 8A—8A of FIG. 5 and showing the ends of the links which connect the movable jaws at this location.
Figures 6, 7, 11, 11A:
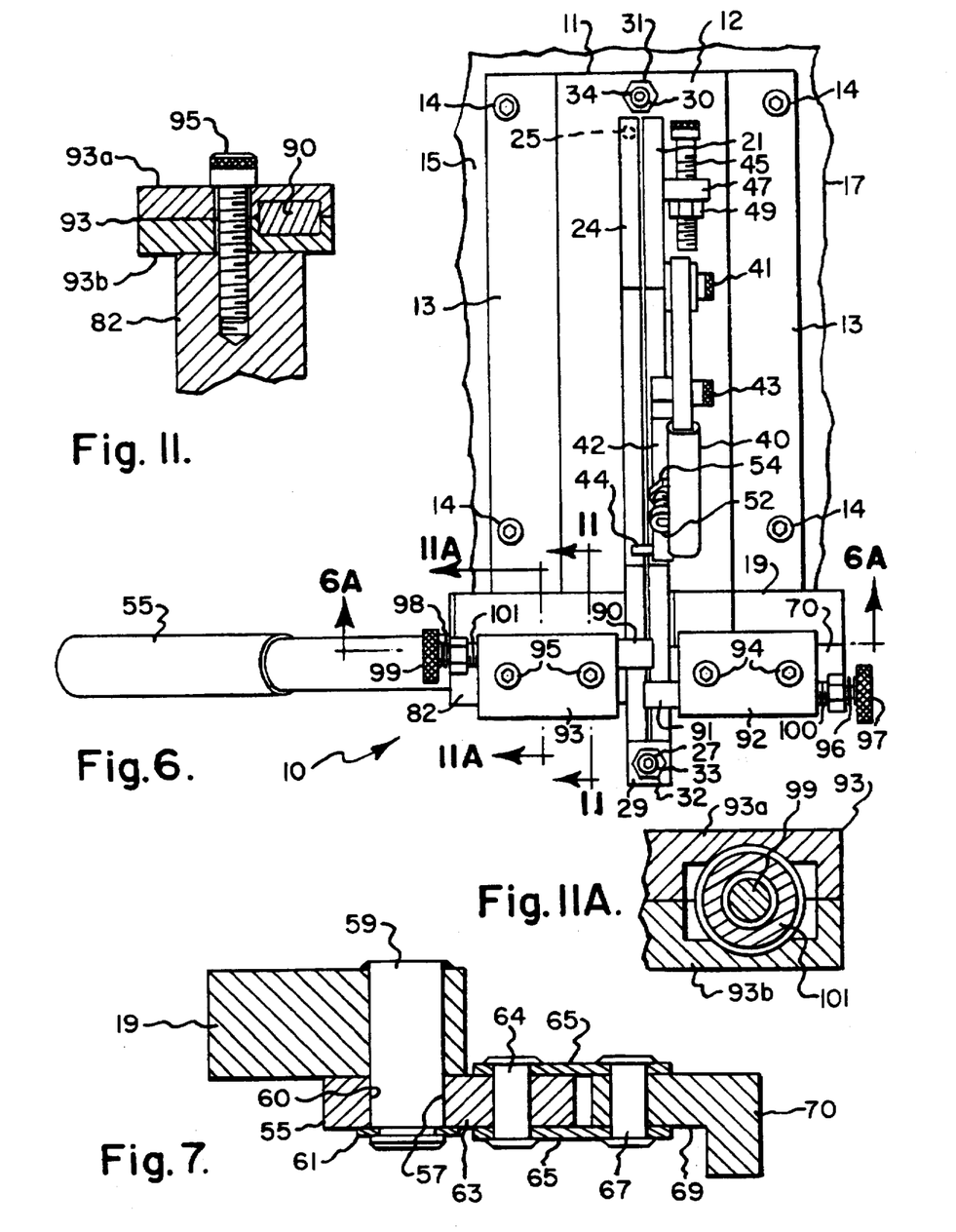
FIG. 6 is a fragmentary plan view of the saw setter taken substantially in the direction of arrows 6—6 of FIG. 5.
FIG. 7 is an enlarged cross sectional view taken substantially along line 7—7 of FIG. 5 and showing the connection between the handle lever and a movable jaw.
FIG. 11 is an enlarged fragmentary cross sectional view taken substantially along line 11—11 of FIG. 6 and showing the connection between the movable jaws and the finger-mounting structure.
FIG. 11A is a fragmentary cross sectional view taken substantially along line 11A—11A of FIG. 6.

A combined saw clamp and guide member 21 (FIGS. 2, 6, 6A and 9) is welded to the top of channel 12 at 22 and to block 19 at 23 (FIG. 2). A movable combined guide and clamp member 24 (FIGS. 3, 6, 6A and 9) has its end pivotally mounted on a pin 25 which extends upwardly through the top of channel 12 (FIGS. 3 and 6). A height adjusting screw 27 (FIGS. 1, 2 and 3) is threaded into nut 32 welded on tab 29 which is welded to the end of clamp member 24. A second height adjusting screw 30 is threaded into nut 31 which is welded to the top of channel 12. By screwing adjusting screws 27 and 30 into and out of nuts 32 and 31, respectively, the level of the tops of their heads 33 and 34, respectively, can be adjusted for supporting the underside 35 of saw blade 37.

At the start of a saw tooth setting operation, the saw blade 37 is placed between spread open clamp members 21 and 24 so that its underside 35 rests on the tops of screw heads 33 and 34. The saw blade is then advanced in a direction 39 (FIG. 2) by means of a manually actuatable advancing lever 40. More specifically, lever 40 is pivotally mounted at 41 on the side of clamp member 21. A pawl 42 is pivotally mounted on lever 40 at 43. A rod or finger 44 extends laterally outwardly from the end of pawl 42 (FIGS. 2, 3 and 6). An adjustment screw 45 is threadably mounted in tab 47 which is welded to the side of clamp 21. After adjusting screw 45 is adjusted to its desired position, a nut 49 secures it in position by bearing against tab 47.

As can be seen from FIG. 2, lever 40 is pivotable from its dotted line position to its solid line position. In doing so, pawl 42 will move from its dotted line position to its solid line position with finger 44 bearing against a tooth 50 of saw blade 37. This will advance the saw a distance of three teeth because at the limit of solid line movement, pawl 42 will engage the end 51 of adjusting screw 52 which is threaded through bar 53 and locked in position by nut 54.

The amount which the saw blade is advanced by lever 40 is depicted in FIGS. 4A and 4B. In FIG. 4A the advancing lever 40 shows the position of tooth finger 44 in engagement with a tooth 50 when lever 40 is in the dotted line position of FIG. 2, and FIG. 4B shows the distance which saw blade 37 has been advanced while finger 44 still engages tooth 50 when lever 40 is in the solid line position of FIG. 2. It will be appreciated that by adjusting the position of adjusting screw 52, the throw of pawl 42 can be adjusted accordingly for saw blades having different spacings between their teeth.

Figures 5, 8:
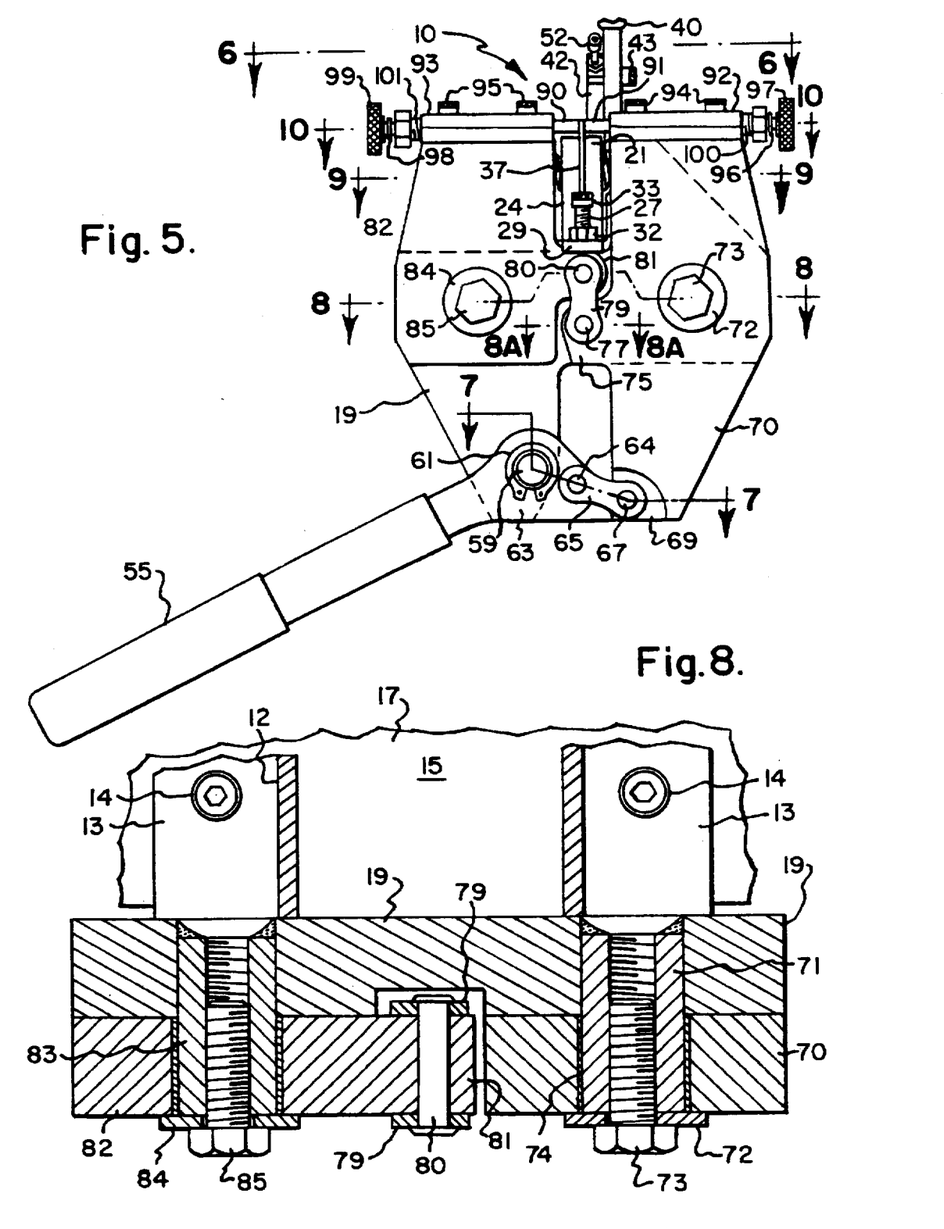
FIG. 5 is an end elevational view similar to FIG. 1 but showing the jaws in a closed tooth setting position.
FIG. 8 is an enlarged fragmentary cross sectional view taken substantially along line 8—8 of FIG. 5 and showing the pivotal connections for the movable jaws and also showing the ends of the links which connect the movable jaws at this location.

After the saw blade 37 has been advanced to a toothsetting position while the clamps 21 and 24 are in a spread open position of FIG. 1, handle lever 55 is pivoted in a counterclockwise direction from its position of FIG. 1 to its position of FIG. 5. In this respect, lever 55 is pivotally mounted at 57 (FIG. 7) on block 19. More specifically, a shaft 59 (FIGS. 6A and 7) is welded into block 19 and extends outwardly therefrom and is received in a bore 60 (FIG. 7) in handle 55 which is retained on shaft 59 by snap ring 61. At this point it is to be noted that the length of lever handle 55 between its outer end to the center of shaft 59 is much greater than the distance between the end 63 (FIG. 7) of lever 55 which extends between the center of shaft 59 and the center of pin 64. This provides an extremely great mechanical advantage when lever 55 is pivoted from its position in FIG. 1 to its position in FIGS. 5 and 5A. A pair of links 65 (FIG. 7) are secured to the ends of shafts 64 and 67. Shaft 67 in turn is mounted in the lower end 69 of jaw 70. Thus when lever handle 55 is moved from the position of FIG. 1 to its position of FIG. 5, jaw 70 will move from its position of FIG. 1 to its position of FIG. 5 because it is pivotally mounted on shaft 71 (FIG. 8) which is welded into block 19. A washer 72 is held against jaw 70 by means of bolt 73, and a bearing 74 is located between shaft 71 and jaw 70. The limit of counterclockwise pivotal movement of lever 55 occurs when the outer end 66 of lever 55 engages surface 68 of jaw 70 (FIG. 5A). At the foregoing limit of counterclockwise movement, the centers of shafts 59, 64 and 67 assume the positions shown in FIG. 5A wherein links 65 are in a substantially dead center position with shaft 59 so that extremely high force is transmitted to jaw 70.

Jaw 70 has a protuberance 75 (FIGS. 1, 5 and 8A) in which pin 77 is mounted. The lower ends of links 79 (FIGS. 1 and 8A) are pivotally mounted on pin 77, and the upper ends of links 79 are mounted on pin 80 (FIGS. 1 and 8) which is located in the end portion 81 of movable jaw 82 which is pivotally mounted on shaft 83 (FIG. 8) which is welded into block 19 (FIGS. 1, 5 and 8). Movable jaw 82 is held in position by washer 84 which is secured by bolt 85. Thus as lever 55 is moved from its position of FIG. 1 to its position of FIG. 5, movable jaw 70 will be pivoted in a counterclockwise direction in FIGS. 1 and 5 and it will exert a tension force on links 79 which in turn will cause movable jaw 82 to pivot in a clockwise direction about its shaft 83. Thus, the jaws 70 and 82 will move from their positions of FIG. 1 to their saw-setting positions of FIG. 5. As noted above, when handle 55 moves from its position of FIG. 1 to its positions of FIGS. 5 and 5A, the shafts 59, 64 and 67 will move to a substantially aligned position wherein substantially maximum pivoting force is exerted on jaw 70.

The pivoting of jaws 70 and 82 from their position of FIG. 1 to their position of FIG. 5 will cause movable jaw 82 to move clamp member 24 from its position of FIG. 1 to its position of FIG. 5 by virtue of the fact that a heavy spring 87 is positioned in bore 89 (FIG. 9) of movable jaw 82 and bears against the side of movable clamp 24 (FIGS. 1 and 9).

Figure 10:
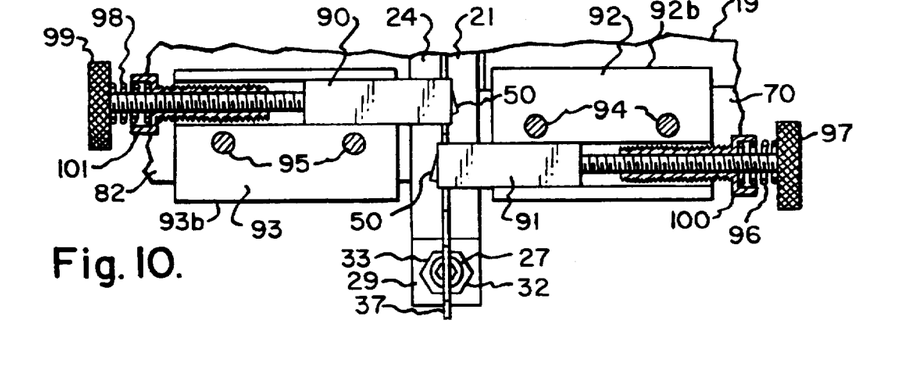
FIG. 10 is an enlarged fragmentary cross sectional view taken substantially along line 10—10 of FIG. 5 and showing the mountings for the saw setting fingers and also showing a saw between the clamping members.
Figure 12:
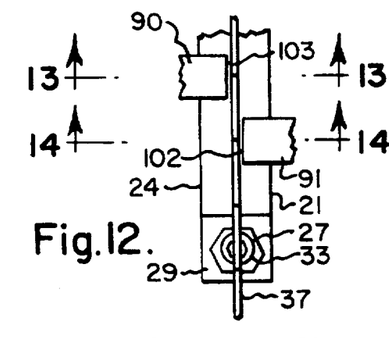
FIG. 12 is a fragmentary diagrammatic view showing the positions of the saw setting fingers during advancement of the saw blade.
Figure 13:
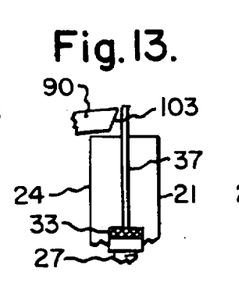
FIG. 13 is a fragmentary cross sectional view taken substantially along line 13—13 of FIG. 12.
Figure 14:
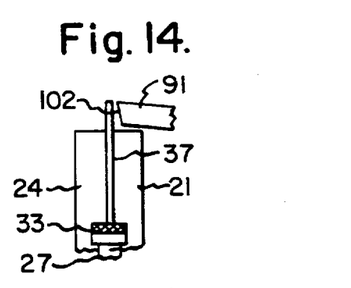
FIG. 14 is a fragmentary cross sectional view taken substantially along line 14—14 of FIG. 12.
Figure 15:
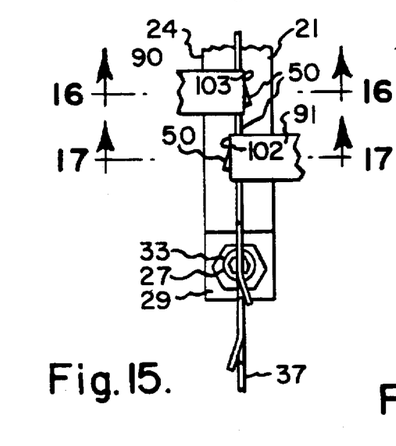
FIG. 15 is a fragmentary plan view showing the saw setting fingers in the positions which they assume when the saw teeth are actually being set.
Figure 16:
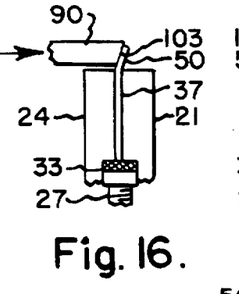
FIG. 16 is a fragmentary cross sectional view taken substantially along line 16—16 of FIG. 15.
Figure 17:
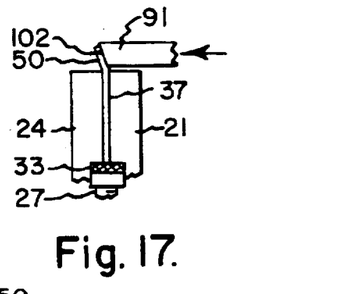
FIG. 17 is a fragmentary cross sectional view taken substantially along line 17—17 of FIG. 15.
Figure 18:
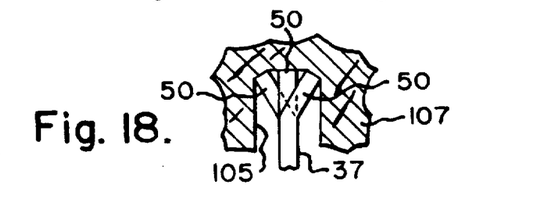
FIG. 18 is a fragmentary cross sectional view showing the saw blade during a saw cutting action.

Saw tooth setting fingers 90 and 91 are mounted at the tops of movable jaws 82 and 70, respectively. More specifically, blocks 92 and 93 (FIGS. 1, 6 and 10) are secured to the tops of movable jaws 70 and 82, respectively, by bolts 94 and 95, respectively. Block 92 is formed from separate blocks 92a and 92b (FIG. 2), and block 93 is formed from blocks 93a and 93b (FIG. 11). Adjusting screws 97 and 99 (FIG. 10) are threadably received in sleeves 100 and 101, respectively, which are threadably secured within blocks 92 and 93, respectively (FIGS. 10 and 11A). Spring 96 is located between the head of screw 97 and sleeve 100, and spring 98 is located between the head of screw 99 and sleeve 101. Springs 96 and 98 maintain adjusting screws 97 and 99 in their adjusted positions. The positions of the ends of screws 97 and 99, by bearing on the ends of fingers 91 and 90, respectively, will determine the positions of the inclined ends 102 and 103 (FIGS. 13 and 14) of fingers 91 and 90, respectively. Thus when jaws 70 and 82 are pivoted, fingers 90 and 91 will be moved from their position of FIG. 12 to their position of FIG. 15 to set teeth 50 of blade 37 in the manner shown in FIGS. 15–17. It is to be noted, however, that fingers 90 and 91 are spread apart so that there will be a tooth 50 (FIG. 15) which is not set, and this is shown in FIG. 18 where the set saw blade 37 is shown with its teeth 50 in a position in a groove 105 which is being cut in a workpiece 107.

It can thus be seen that the teeth 50 of the saw blade 37 are set by moving handle lever 55 from its position in FIG. 1 to its position in FIG. 5. After the setting has been effected, lever handle 55 is pivoted in a clockwise direction from its position of FIG. 5 to its position of FIG. 1. This will cause jaw 70 to be pivoted in a clockwise direction from its position of FIG. 5 to its position of FIG. 1, and this clockwise pivoting is aided by spring 107' (FIG. 9) which is located in bore 109 of jaw 70 and bears against the side of stationary clamp member 21. Furthermore, because of the connection between jaws 70 and 82 through links 79, jaw 82 will pivot in a counterclockwise direction in FIGS. 1 and 5, and by virtue of the foregoing pivoting of jaws 70 and 82, setting fingers 90 and 91 will return to their positions of FIGS. 1 and 12 so that the saw blade 37 can be advanced by returning lever 40 (FIG. 2) back to its dotted line position preparatory to moving it to its solid line position to advance saw blade 37 for a subsequent tooth setting action.

Figure 19:
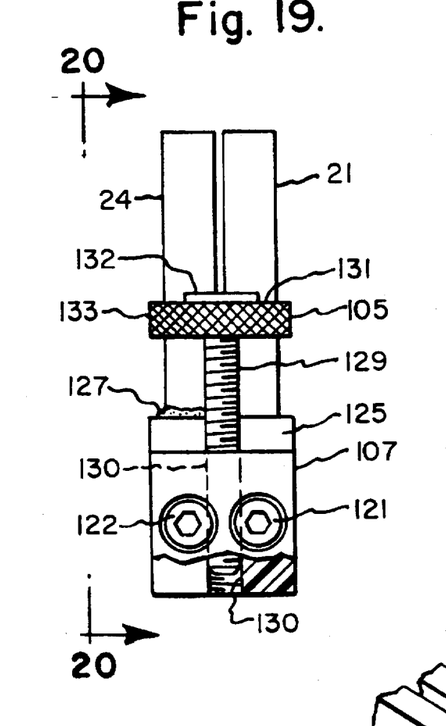
FIG. 19 is a fragmentary perspective view of an alternate form of a saw inlet height adjusting mechanism.
Figure 20:
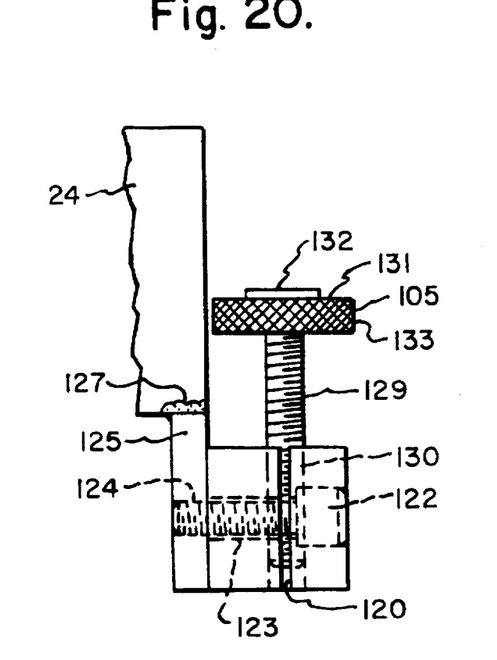
FIG. 20 is a fragmentary front elevational view of an alternate form of a saw outlet height adjusting mechanism.
Figure 21:
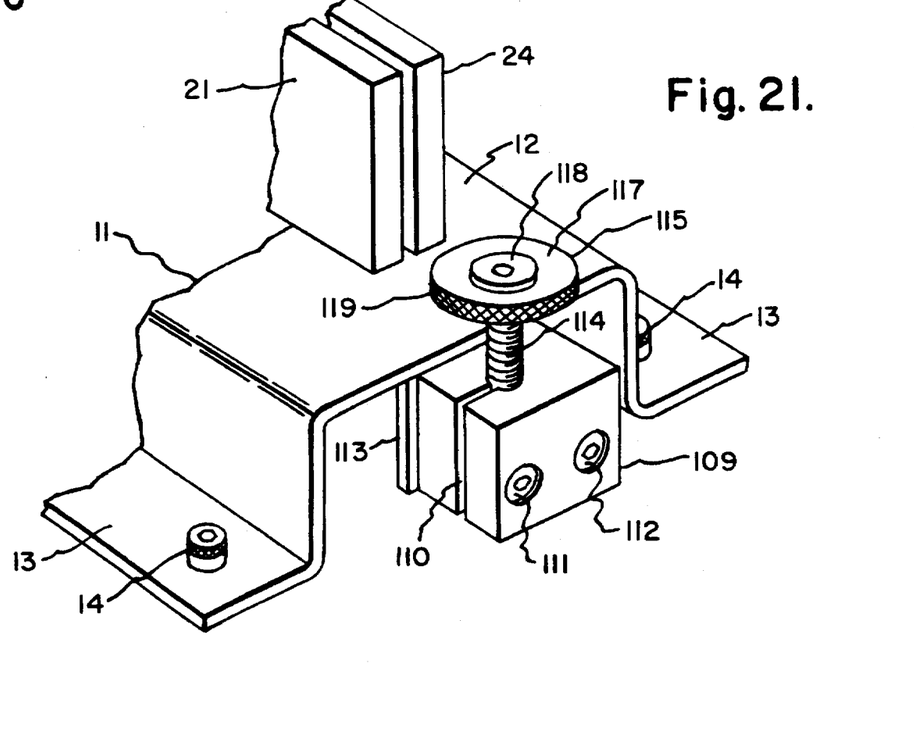
FIG. 21 is a fragmentary side elevational view taken substantially in the direction of arrows 21—21 of FIG. 20.

In FIGS. 19–21 an alternate embodiment of the height adjusting screws is disclosed. The numerals in FIGS. 19–20 which are identical to the numerals in the preceding figures denote like elements of structure and therefore the description of such structure will not be repeated.

In FIGS. 19–20 the saw outlet height adjusting screw 105 is shown at the saw outlet end of saw clamp and guide members 21 and 24. The adjusting screw 105 is threadably mounted in plastic block 107 which is identical to plastic block 109 (FIG. 21) located at the saw entry end of combined clamp and guide members 21 and 24. Block 109 has a slot 110 therein which extends all the way to the threaded bore which receives the shank 114 of height adjusting screw 115. Screws 111 and 112 extend through oversized bores in block 11 and are threadably received in plate 113 which is welded to the underside of the central channel portion 12. By tightening screw 111, which extends through slot 110, the tightness of the threaded connection between shank 114 of height adjusting screw 115 can be adjusted. Screw 115 has a broadened head 117 and a platform 118 for supporting the underside of a saw blade, and it also has a knurled peripheral surface 119 to facilitate manual turning of screw 115. Thus, by turning height adjusting screw 115 in block 109, its height can be adjusted.

The saw outlet height adjusting screw 105 is threadably received in block 107 which, as noted above, is identical to block 109. More specifically block 107 has a slot 120 which is identical to slot 110 of block 109. In addition, two screws 121 and 122, which correspond to screws 112 and 111, respectively, extend through oversized bores, such as 123, and are threadably received in bores 124 in plate 125 which is welded to the lower edge of combined guide and clamp member 24 at 127. The threaded shank 129 of height adjusting screw 105 is threadably received in threaded bore 130, and as noted above relative to screw 111 of FIG. 19, by adjusting the tightness of screw 122 the degree of tightness of shank 129 in bore 130 can be adjusted. The head 131 of screw 105 has a platform 132 thereon which supports the underside of the blade. Furthermore, as noted above relative to height adjusting screw 115, the outer periphery of head 133 is knurled to facilitate digital gripping for turning the screw to a desired saw-supporting height.

While preferred embodiments of the present invention have been disclosed, it will be appreciated that it is not limited thereto but may be otherwise embodied within the scope of the following claims.

We claim:

1. A saw setter comprising a base having an upper base portion and a lower base portion, a first pivot on said lower base portion, a lever handle pivotally mounted on said first pivot and including an outer lever portion to one side of said first pivot and an inner lever portion to the other side of said first pivot, said outer lever portion being longer than said inner lever portion, a second pivot on said upper base portion, a first movable jaw pivotally mounted on said second pivot, a first mechanical coupling between said inner lever portion and said first pivotal jaw below said second pivot, a third pivot on said upper base portion, a second movable jaw pivotally mounted on said third pivot, and a second mechanical coupling between said first and second movable jaws.

2. A saw setter as set forth in claim 1 including a first clamp plate mounted on said upper base portion adjacent said first jaw at a higher elevation than said second pivot, and a second clamp plate mounted adjacent said second jaw and said first clamp plate.

3. A saw setter as set forth in claim 2 including a spring mounted between said second clamp plate and said second jaw.

4. A saw setter as set forth in claim 2 wherein said first mechanical coupling comprises a link having a first end pivotally mounted on said inner portion of said lever handle by a fourth pivot, and wherein said link has a second end pivotally mounted on said first pivotal jaw by a fifth pivot, and wherein said first and fourth and fifth pivots have axes which are substantially aligned when said first and second movable jaws are in saw-setting positions.

5. A saw setter as set forth in claim 4 including a spring mounted between said second clamp plate and said second jaw.

6. A saw setter as set forth in claim 1 wherein said first mechanical coupling comprises a link having a first end pivotally mounted on said inner portion of said lever handle by a fourth pivot, and wherein said link has a second end pivotally mounted on said first pivotal jaw by a fifth pivot, and wherein said first and fourth and fifth pivots have axes which are substantially aligned when said first and second movable jaws are in saw-setting positions.

7. A saw setter as set forth in claim 6 including a first mounting for a first saw setting finger on said first jaw above said second pivot, and a second mounting for a second saw setting finger on said second jaw above said third pivot.

8. A saw setter as set forth in claim 7 including first and second saw setting fingers and on first and second mountings, respectively.

9. A saw setter as set forth in claim 8 including a first clamp plate mounted on said upper base portion adjacent said first jaw at a higher elevation than said second pivot, and a second clamp plate mounted adjacent said second jaw and said first clamp plate.

10. A saw setter as set forth in claim 9 including a spring mounted between said second clamp plate and said second jaw.

11. A saw setter as set forth in claim 1 including a saw advance lever pivotally mounted on said upper base portion.

12. A saw setter as set forth in claim 11 including a saw advancing finger mounted on said saw advance lever.

13. A saw setter as set forth in claim 11 including a first clamp plate mounted on said upper base portion adjacent said first jaw at a higher elevation than said second pivot, and a second clamp plate mounted adjacent said second jaw and said first clamp plate.

14. A saw setter as set forth in claim 13 including a spring mounted between said second clamp plate and said second jaw.

15. A saw setter as set forth in claim 14 wherein said first mechanical coupling comprises a link having a first end pivotally mounted on said inner portion of said lever handle by a fourth pivot, and wherein said link has a second end pivotally mounted on said first pivotal jaw by a fifth pivot, and wherein said first and fourth and fifth pivots have axes which are substantially aligned when said first and second movable jaws are in saw-setting positions.

16. A saw setter as set forth in claim 15 including a first mounting for a first saw setting finger on said first jaw above said second pivot, and a second mounting for a second saw setting finger on said second jaw above said third pivot.

17. A saw setter as set forth in claim 16 including first and second saw setting fingers and on first and second mountings, respectively.

18. A saw setter as set forth in claim 17 including a saw advancing finger mounted on said saw advance lever.

19. A saw setter as set forth in claim 1 including a first clamp member mounted on said upper base portion adjacent said first jaw at a higher elevation than said second pivot, and a second clamp member mounted adjacent said second jaw and said first clamp member.

20. A saw setter as set forth in claim 19 including a spring between said second clamp member and said second jaw.

21. A saw setter as set forth in claim 19 wherein said first mechanical coupling comprises a link having a first end pivotally mounted on said inner portion of said lever handle by a fourth pivot, and wherein said link has a second end pivotally mounted on said first pivotal jaw by a fifth pivot, and wherein said first and fourth and fifth pivots have axes which are substantially aligned when said first and second movable jaws are in saw-setting positions.

22. A saw setter as set forth in claim 21 including a saw advance lever pivotally mounted on said upper base portion.

23. A saw setter as set forth in claim 19 including a spring between said second clamp member and said second jaw.

24. A saw setter as set forth in claim 1 wherein said first mechanical coupling comprises a first link having a first end of said first link pivotally mounted by a fourth pivot on said inner portion of said lever handle and a second end of said first link pivotally mounted by a fifth pivot on said first pivotal jaw, and wherein said second mechanism coupling comprises a second link having a first end of said second link pivotally mounted on said first pivotal jaw and a second end of said second link pivotally mounted on said second movable jaw.

25. A saw setter as set forth in claim 24 including a first clamp member mounted on said upper base portion adjacent said first jaw at a higher elevation than said second pivot, and a second clamp member mounted adjacent said second jaw and said first clamp member.

26. A saw setter as set forth in claim 25 including a spring between said second clamp member and said second jaw.

27. A saw setter as set forth in claim 24 wherein said first pivot and said fourth pivot and said fifth pivot have axes which are in substantial alignment when said first and second movable jaws are in saw-setting positions.

* * * * *